Patented Mar. 14, 1939

2,150,787

UNITED STATES PATENT OFFICE 2,150,787

MONO-AZO ACID WOOL DYESTUFF

Carl Theo Schultis, Bergen, near Frankfort-on-the-Main, and Ernst Korten, Frankfort-on-the-Main-Fechenheim, Germany, assignors to General Aniline Works, Inc., New York, N. Y., a corporation of Delaware No Drawing. Application July 2, 1937, Serial No. 151,662. In Germany July 29, 1936

4 Claims. (Cl. 260—198)

Our present invention relates to acid wool dyestuffs, more particularly to those of the general formula:

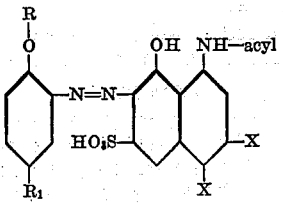

wherein R stands for a member selected from the group consisting of aliphatic radicals and unsubstituted members of the benzene series, $R_1$ stands for a member selected from the group consisting of aliphatic radicals containing at least six carbon atoms and the cyclohexyl radical, wherein R and $R_1$ together must contain at least 10 carbon atoms, one X means hydrogen and the other a sulfonic acid group, which dyestuffs dye the animal fibers reddish shades of a good fastness. They are particularly valuable by the fact that they tinge in the dyeing process of mixed tissues of wool and cotton the latter to a very little degree. The new dyestuffs are obtained by combining diazo-derivatives of aminocompounds of the general formula:

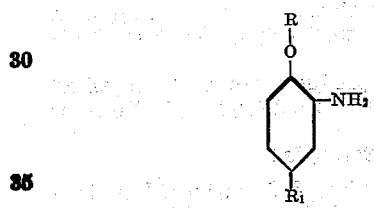

wherein R and $R_1$ have the aforesaid significations with acyl-derivatives of 1-amino-8-hydroxynaphthalene-3.6- and -4.6- disulfonic acids. The above amines may be prepared by starting from 1-hydroxybenzene-derivatives, containing in the 4-position a radicle signified in the above formulae by $R_1$, nitrating such compounds, etherifying the hydroxy group and reducing the nitro group.

In order to further illustrate our invention the following examples are given the parts being by weight; but we wish it, however, to be understood that our invention is not limited to the particular products or reaction conditions stated therein.

Example 1

24.7 parts of 3-aminohexahydrodiphenyl-4-isobutylether are dissolved in about 300 parts of hot water and 24 parts of concentrated hydrochloric acid ($d=1.19$) and the diazotisation is carried out by means of the corresponding quantity of sodium nitrate at 5 to 10° C. The formed diazosolution is combined at about 10° C. with an aqueous solution of 53 parts of 1-(2'5'-dimethyl-4'-chlorobenzenesulfo)-amino-8-napthol-3.6-disulfonic acid and 34 parts of sodium carbonate. The isolated and dried dyestuff of the formula:

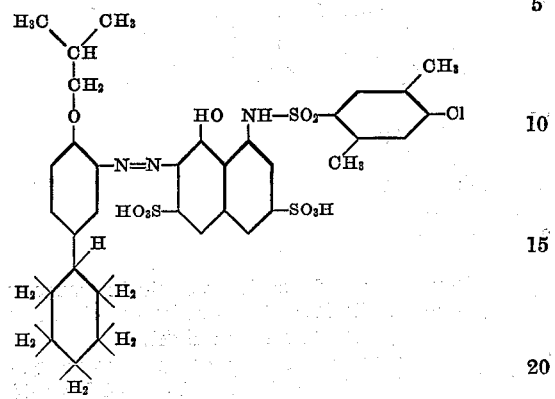

is a dark red powder soluble in water with a red coloration and dyes wool bright bluish red shades of a good fastness to filling, perspiration and light.

Example 2

28.1 parts of 3-aminohexahydrodiphenyl-4-benzylether are diazotized. The diazosolution thus obtained is added to a solution of 49 parts of 1-(2'-chlorophenoxyacetyl)amino-8-naphthol-4.6-disulphonic acid. When the combination has been finished the formed dyestuff of the formula:

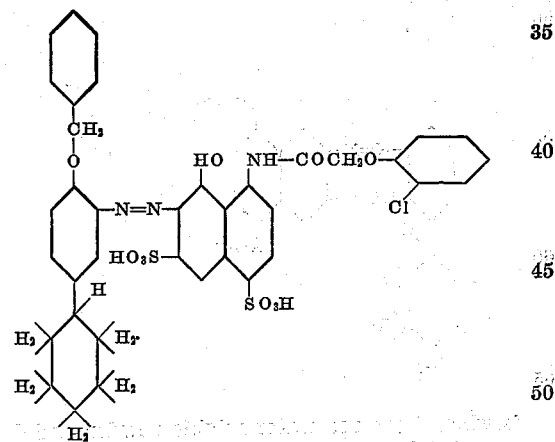

is isolated. It is when dry a red water soluble powder and dyes wool bright red shades fast to washing, perspiration and light.

When combining the diazocompound of 3-amino-hexahydro-diphenyl-4-benzylether with 1-(2'5'-dimethyl-4'-chlorobenzene-sulfo)-amino-8-naphthol-3.6-disulfonic acid or with 1-(benzene-sulfo- or paratoluene-sulfo)-amino-8- naphthol-3.6-disulfonic acid dyestuffs are obtained which dye wool very bright and fast bluish red shades.

Example 3

The diazocompound of 24.7 parts of 3-amino-hexahydro-diphenyl-4-n-butylether is combined in the presence of sodium carbonate with 49 parts of 1-(2'-chlorophenoxyacetyl)-amino-8-naphthol-3.6-disulfonic acid. The isolated dyestuff of the formula:

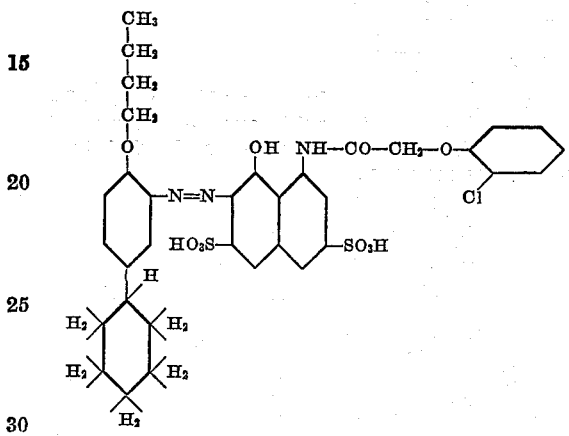

is when dry a red powder soluble in water with a red color. It dyes wool bright red shades fast to filling, perspiration and light.

When using as coupling component acetyl- or benzoyl-1.8-aminonaphthol-3.6- or -4.6-disulfonic acid dyestuffs are obtained exhibiting pure shades and a good fastness.

Example 4

The diazocompound of 26.7 parts of 3-amino-hexahydrodiphenyl-4-phenylether is combined in the presence of sodium carbonate with 49 parts of 1-(2'-chlorophenoxyacetyl)-amino-8-naphthol-4.6 disulfonic acid. The formed dyestuff of the formula:

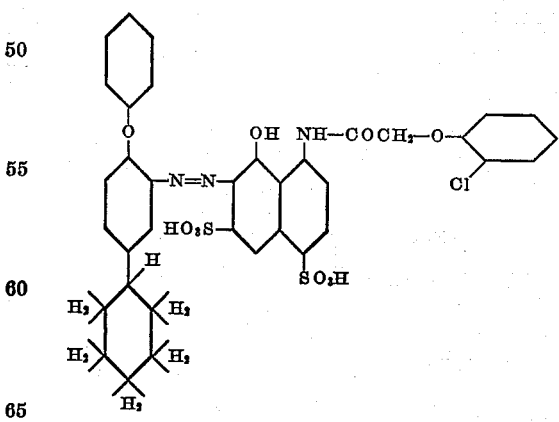

is when dry a red water soluble powder and dyes wool bright red shades fast to filling, perspiration and light.

Example 5

The diazocompound of 28.3 parts of 3-amino-isohexylphenyl-4-benzylether is combined at about 5 to 10° C. in the presence of sodium carbonate with 40 parts of 1-(2'.5'-dichlorobenzoyl)-amino-8-naphthol-3.6-disulfonic acid. The formed dyestuff of the formula:

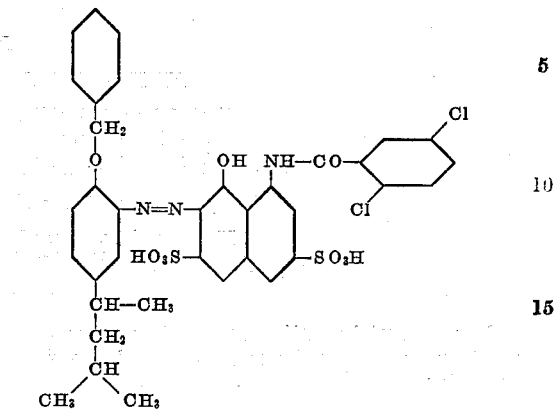

is when dry a red water soluble powder and dyes wool bluish red shades of a good fastness.

Example 6

The diazocompound of 26.3 parts of 3-amino-isooktylphenyl-4-isopropylether is combined in the presence of lime with 53 parts of 1-(2'5'-dimethyl-4'-chlorobenzenesulfo)-amino-8-naphthol-3.6-disulfonic acid. The formed dyestuff of the formula:

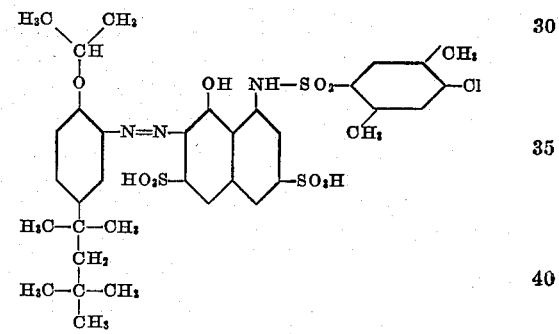

is when dry a red powder, soluble in water with a red color and dyes wool bright and fast bluish red shades.

Similar valuable products are obtained when starting from 3-amino-isooktylphenyl-ethyl- or buthylether.

Example 7

The diazocompound of 31.1 parts of 3-amino-isooktylphenyl-4-benzylether is combined in the presence of sodium carbonate with 47 parts of 1-(2'-methylphenoxyacetyl)-amino-8-naphthol-3.6-disulfonic acid. The formed dyestuff of the formula:

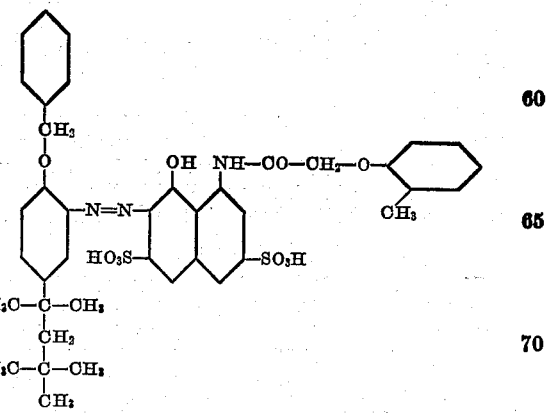

is when dry a red water soluble powder and dyes wool bright and fast red shades.

We claim:
1. Acid wool dyestuffs of the general formula:

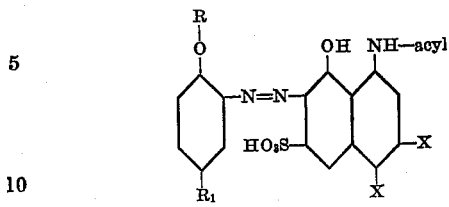

wherein R stands for a member selected from the group consisting of aliphatic radicals and unsubstituted members of the benzene series, $R_1$ stands for a member selected from the group consisting of aliphatic radicals containing at least six carbon atoms and the cyclohexyl radicle, wherein R and $R_1$ together must contain at least 10 carbon atoms, one X means hydrogen and the other a sulphonic acid group, which dyestuffs dye the animal fibers reddish shades of a good fastness.

2. An acid wool dyestuff of the formula:

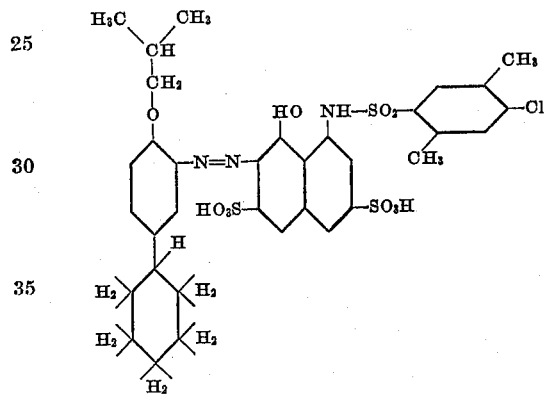

which dyestuff is when dry a dark red powder soluble in water with a red coloration and dyes wool bright bluish red shades of a good fastness to filling, perspiration and light.

3. An acid wool dyestuff of the formula:

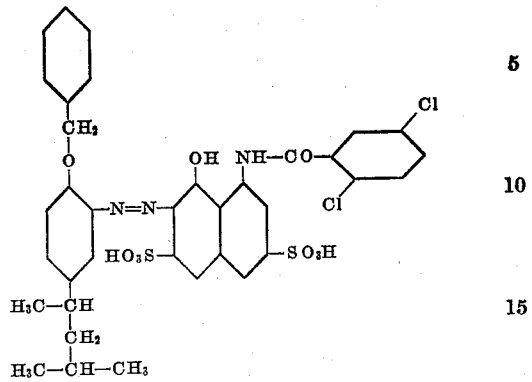

which dyestuff is when dry a red water soluble powder and dyes wool bluish red shades of a good fastness.

4. An acid wool dyestuff of the formula:

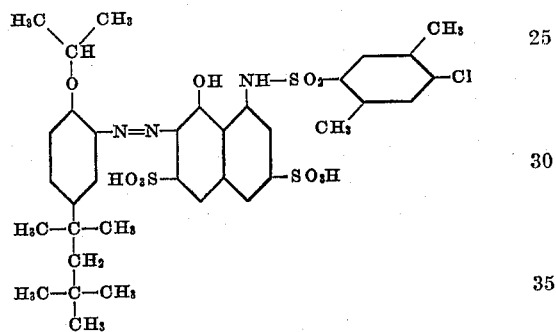

which dye stuff is when dry a red powder, soluble in water with a red color and dyes wool bright and fast bluish red shades.

CARL THEO SCHULTIS.
ERNST KORTEN.